United States Patent
Paranjape

(10) Patent No.: US 10,755,535 B2
(45) Date of Patent: Aug. 25, 2020

(54) ON DEMAND SELF CHECKOUT

(75) Inventor: Jagadish Bhalchandra Paranjape, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 679 days.

(21) Appl. No.: 13/591,763

(22) Filed: Aug. 22, 2012

(65) Prior Publication Data
US 2014/0058946 A1 Feb. 27, 2014

(51) Int. Cl.
*G06Q 20/20* (2012.01)
*G06Q 20/32* (2012.01)
*G07G 1/00* (2006.01)

(52) U.S. Cl.
CPC ......... *G07G 1/0081* (2013.01); *G06Q 20/208* (2013.01); *G06Q 20/322* (2013.01)

(58) Field of Classification Search
CPC ............ Y02D 70/1222; H04J 11/0073; H04W 48/16; H04W 52/0209; H04W 84/105; H04W 88/02; H04W 88/08; H04W 12/00503; H04W 4/80; H04L 1/00; H04B 7/0673; G06Q 20/20; G06Q 20/327; G06Q 20/352; G06Q 20/325; G07F 7/0886
USPC ...................................................... 705/44, 35
See application file for complete search history.

(56) References Cited

U.S. PATENT DOCUMENTS

| | | | |
|---|---|---|---|
| 7,866,546 B1 * | 1/2011 | Vance ....................... | G07G 1/14 235/379 |
| 8,751,316 B1 * | 6/2014 | Fletchall ............... | G07G 1/0081 705/16 |
| 10,366,378 B1 * | 7/2019 | Han ..................... | G06Q 20/401 |
| 2005/0256781 A1 * | 11/2005 | Sands .................. | G06Q 10/087 705/26.8 |
| 2012/0209730 A1 * | 8/2012 | Garrett ................... | G06Q 30/06 705/15 |
| 2012/0310743 A1 * | 12/2012 | Johri ..................... | G06Q 20/352 705/14.58 |
| 2012/0316963 A1 * | 12/2012 | Moshfeghi ........... | G06Q 20/327 705/14.58 |
| 2013/0097079 A1 * | 4/2013 | Bruder ............... | G06Q 20/3278 705/44 |
| 2013/0189953 A1 * | 7/2013 | Mathews ................ | H04L 12/28 455/411 |
| 2013/0317927 A1 * | 11/2013 | Bush ...................... | H04W 4/80 705/21 |

(Continued)

FOREIGN PATENT DOCUMENTS

EP          3 605 432     *  2/2020

OTHER PUBLICATIONS

Proximity Mobile Payments: Leveraging NFC and the Contactless Financial Payments Infrastructure; Sep. 2007 (Year: 2007).*

(Continued)

*Primary Examiner* — Abhishek Vyas
(74) *Attorney, Agent, or Firm* — Haynes and Boone LLP

(57) ABSTRACT

A method and system provide on demand self checkout for users purchasing products from a store, according to an embodiment. When a user believes that lines at a conventional clerk operated checkout counter are too long or when the user merely wants to do a self checkout, the user can go to a designated area in the store. The user can open an app installed on the user's mobile device and can perform a self checkout by scanning the products with the mobile device.

21 Claims, 4 Drawing Sheets

(56) References Cited

U.S. PATENT DOCUMENTS

| | | | | |
|---|---|---|---|---|
| 2013/0343214 | A1* | 12/2013 | Yamamoto | H04L 1/00 370/252 |
| 2015/0170132 | A1* | 6/2015 | Patel | G06Q 20/3226 705/44 |
| 2015/0229623 | A1* | 8/2015 | Grigg | G06Q 20/34 726/7 |
| 2015/0348007 | A1* | 12/2015 | Khan | G06Q 20/40975 705/44 |

OTHER PUBLICATIONS

Near Field Communication in Cell Phones, Annika Paus Jul. 24, 2007 (Year: 2007).*

IEEE Recommended Practice for Data Communications Between Remote Terminal Units and Intelligent Electronic Devices in a Substation. 1379-2000: IEEE Recommended Practice for Data Communications Between Remote Terminal Units & Intelligent Electronic Devices in a Substation. Jan. 2000:1. (Year: 2000).*

U. B. Ceipidor, C. M. Medaglia, A. Marino, S. Sposato and A. Moroni, "KerNeeS: A protocol for mutual authentication between NFC phones and POS terminals for secure payment transactions," 2012 9th International ISC Conference on Information Security and Cryptology, Tabriz, 2012, pp. 115-120. (Year: 2012).*

\* cited by examiner ately the costs associated with the operation and maintenance of the equipment of such self checkout counters.
ON DEMAND SELF CHECKOUT

BACKGROUND

Technical Field

The present disclosure generally relates to electronic commerce and, more particularly, relates to methods and systems for facilitating on demand self checkout when purchasing products at stores.

Related Art

Checkout counters are used by customers to pay for products purchased in stores. Typically, a customer will wait in line at a checkout counter until it is the customer's turn to check out. When the customer reaches the counter, a checkout clerk scans the products being purchased and accepts payment for the products from the customer. However, it is common for lines at checkout stores to grow to such a length that the wait is inconvenient for the customer. Indeed, the checkout lines can be so long that customers are discouraged from shopping at the store.

Sometimes a store will open additional checkout counters when the lines are too long. This is done in an attempt to avoid annoying the customers who are waiting in line. However, the costs associated with constructing and operating checkout counters tends to discourage stores from constructing and operating a sufficient number of checkout counters to insure that the checkout lines can always remain at a reasonable length. Further, once all of the checkout counters have been opened, there is generally nothing further that a store with only traditional clerk operated checkout counters can do to reduce the customer's wait.

In an attempt to mitigate undesirably long lines and to reduce operational costs, some stores have introduced self checkout counters. The customer, rather than the checkout clerk, scans the products being purchased. Typically, self checkout counters are less costly to install and operate as compared to traditional clerk operated checkout counters. Self checkout counters can also take up less floor space and do not require a dedicated checkout clerk. Generally, one checkout clerk can monitor several self checkout counters. Sometimes, no checkout clerks are present at the self checkout counters. Thus, a merchant may be inclined to install additional self checkout counters rather than additional clerk operated checkout counters. By taking advantage of such self checkout counters, customers can check out more quickly and are thus more likely to return to the merchant's store.

Although such self checkout counters are less costly than traditional clerk operated checkout counters, there is still a substantial investment in equipment, as well as ongoing costs associated with the operation and maintenance of the equipment of such self checkout counters.

DETAILED DESCRIPTION

Figure 1:
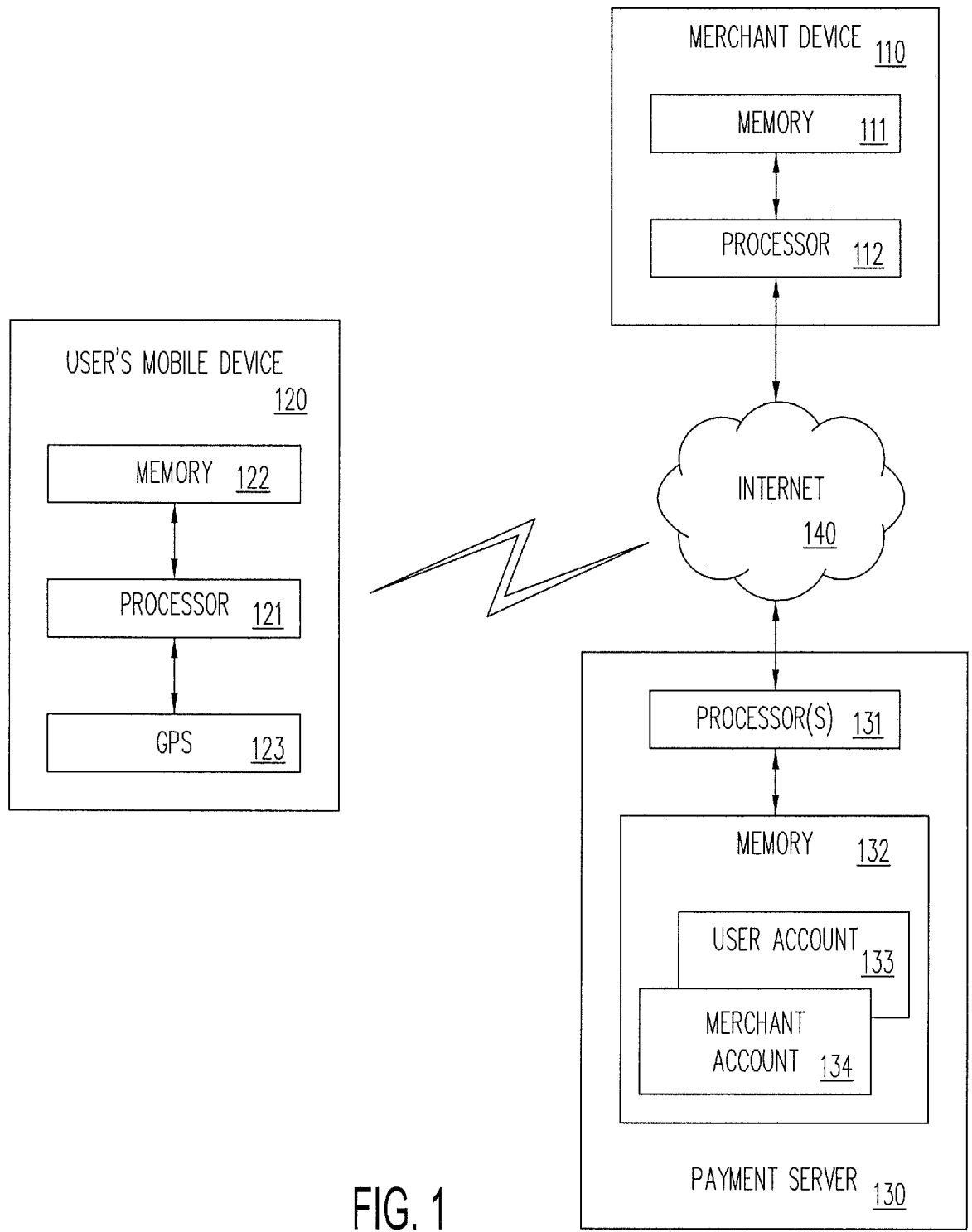
FIG. 1 is a block diagram of a system for on demand self checkout, according to an embodiment.

A method and system can provide on demand self checkout for users purchasing products from a store, according to an embodiment. When a user believes that lines at a conventional clerk operated checkout counter are too long or when the user merely wants to do a self checkout, the user can go to a designated area in the store. The user can open an app installed on the user's mobile device and can perform a self checkout by scanning the products to be purchased with the mobile device.

According to an embodiment, adding on demand self checkout stations can be done easily and quickly. The addition of on demand self checkout stations can be primarily or completely software based. That is, adding more on demand self checkout stations can be done without the need to add substantial, if any, additional hardware. Since little or no additional hardware is required, a merchant is more likely to use the on demand self checkout system. Thus, the length of checkout lines can be reduced and user convenience can be enhanced.

According to an embodiment, a system can comprise a memory that stores information regarding the merchant. The system can further comprise one or more processors that are operable to receive a communication including an indication of a desire of a user to perform an on demand self checkout to purchase one or more products from the merchant, enable an on demand self checkout station of the merchant, and facilitate payment for the product by the user via a mobile device.

The processors can be operative to cooperate with the memory to determine if the on demand self checkout is being requested from a predefined location, e.g., a predefined on demand checkout station, and to only enable the self checkout station if the on demand self checkout is being requested from the predefined on demand checkout station. If the on demand self checkout is not being requested from a predefined location, then the user can be instructed to move to one of the predefined locations, e.g., one of the on demand checkout stations.

The memory can be a memory of a merchant device and the processors can be processors of the merchant device. The memory can be a memory of a payment server and the processors can be processors of the payment server. The memory and the processors can be part of any device, computer, server, network, or combination thereof. The memory and the processors can be located at the store of the merchant, at a facility of a payment provider, such as Paypal, Inc., or at any other location.

The processors can be operative to access an account of the user. The account of the user can contain information regarding the user such as an amount of any deposited money, a credit limit, a spending limit, and the like. The processors can be operative to authorize a transaction, e.g., the purchase transaction of the user. For example, the processors can be operative to authorize the transaction if the deposited amount, the credit limit, or the spending will not be exceeding by the purchase transaction.

According to an embodiment, the processors can be operative to disable the on demand self checkout station after the user has purchased the product. Thus, once the on demand self checkout has been completed, the on demand self checkout station can be closed or disabled. If another user desires to use the on demand self checkout station, then the other user must have the on demand self checkout station re-enabled.

Alternatively, the on demand self checkout station can remain enabled after the user has completed self checkout in order to provide other users an opportunity to use the on demand self checkout station. The on demand self checkout station can remain enabled for a limited, e.g., predetermined, length of time after the user has completed self checkout. Alternatively, the on demand self checkout station can remain enabled for an indefinite length of time after the user has completed self checkout. For example, on demand self checkout station can remain enabled until store personnel disable the on demand self checkout station.

All of the on demand self checkout stations can automatically be disabled when the store closes, e.g., at the end of the day. Thus, each day can begin with none of the on demand self checkout station can enabled.

The information regarding the merchant can include information regarding the on demand self checkout station. For example, the information can include the number of on demand self checkout stations in the store, the locations of on demand self checkout stations in the store, and/or any other information.

The information can include limitations regarding the on demand self checkout stations. For example, the information can include restrictions on the credit cards or other devices or instruments that can be used by the users to pay for the products being purchased. As a further example, the information can include restrictions on the amount of money that can be used to purchase products at the on demand self checkout stations. Thus, the total costs of products purchased by the user can be limited. The total costs of products purchased by the user can be limited on a per visit basis, on a per day basis, on a per week basis, on a per month basis, on a per year basis, or on any other basis.

The information can include limitations regarding the products that can be purchased at the on demand self checkout stations. For example, products such as alcohol and tobacco can be excluded from being purchased at the on demand self checkout stations. Alternatively, products such as alcohol and tobacco can be purchased at the on demand self checkout stations if a proper identification of the user is presented, such as to a scanner of the on demand self checkout system or to store personnel. Store personnel can be alerted to an attempt to purchase such products.

The processors can be operative to access an account of the user, determine from the account of the user if a payment transaction for the on demand self checkout qualifies to be authorized, and to authorize the payment transaction if the payment transaction qualifies to be authorized. The payment transaction can be declined if the user fails to meet any criteria for making the purchase. The criteria can be defined by the merchant, by the payment provider, or by anyone else.

According to an embodiment, a method can comprise storing, in a memory, information regarding a merchant. The method can further comprise receiving, electronically by one or more processors, a communication including an indication of a desire of a user to perform an on demand self checkout to purchase a product from the merchant; enabling, by the processors, an on demand self checkout station of the merchant; and facilitating, by the processors, payment for the product by the user via a mobile device. According to an embodiment, a computer program product can comprise a non-transitory computer readable medium having computer readable and executable code for instructing processors to perform the method.

According to an embodiment, a system can comprise a memory storing information regarding a merchant. One or more processors can be operable to receive a request for payment from a user device at a location (such as the location of an on demand checkout counter) associated with a merchant, determine whether the location is within a dynamic boundary (such as where the merchant has determined that the on demand checkout counters are to be located) designated to receive payments for the merchant, and process the payment request if the location is within the dynamic boundary. The processor(s) can be operative to cooperate with the memory to determine if the location is a predefined location and to only process the payment if the location is the predefined location. The processor(s) can be operable to access an account of the user, determine, at least in part, from the account of the user if the payment request is authorized to be processed, and to authorize the payment request if the payment request is authorized to be processed. The processor(s) can be operable to inhibit further processing of payment requests after the payment request has been processed and before another payment request is authorized to be processed. The information regarding the merchant can include information regarding the location.

According to an embodiment, a method can comprise storing, in a memory, information regarding a merchant. The method can further comprise receiving, electronically by one or more processors, a request for payment from a user device at a location associated with a merchant. The method can further comprise determining, by the processor(s), whether the location is within a dynamic boundary designated to receive payments for the merchant. The method can further comprise processing, by the processor(s), the payment request if the location is within the dynamic boundary. According to an embodiment, a computer program product can comprise a non-transitory computer readable medium having computer readable and executable code for instructing processors to perform the method.

FIG. 1 is a block diagram of a system for on demand self checkout, in accordance with an embodiment. The system can include a merchant device 110. The merchant device 110 can be a merchant checkout terminal, a computer, and/or a server, for example. The merchant device 110 can include a memory 111 and a processor 112.

The system can include a user's mobile device 120. The user's mobile device 120 can be carried by the user. The user's mobile device 120 can be a cellular telephone, a smart telephone, a hand held computer, a laptop computer, a notebook computer, or a tablet computer, for example. The user's mobile device 120 can include a processor 121, a memory 122, and a global positioning system (GPS) 123.

The user's mobile device 120 can be configured for scanning or communications such as bar code reading, near field communications (NFC), radio frequency identification (RFID), and/or any other type of scanning or communications. An app of the user's mobile device 120 can cooperate with such scanning or communications to facilitate scanning of products during a self checkout procedure.

The system can include a payment server 130. The payment server 130 can be a server of a payment provider, such as Paypal, Inc. The payment server 130 can be a single server or can be a plurality of servers. The payment server 130 can include one or more processors 131 and a memory 132. The memory 132 can be a memory of the payment server 130 or a memory that is associated with the payment server 130. The memory 132 can be a distributed memory. The memory 132 can store a user account 133 and a merchant account 134.

The merchant device 110, the user's mobile device 120, and the payment server 130 can communicate with one another via a network, such as the Internet 140. The merchant device 110, the user's mobile device 120, and the payment server 130 can communicate with one another via a plurality of networks, such as local area networks (LANs), wide area networks (WANs), cellular telephone networks, and the like.

Figure 2:
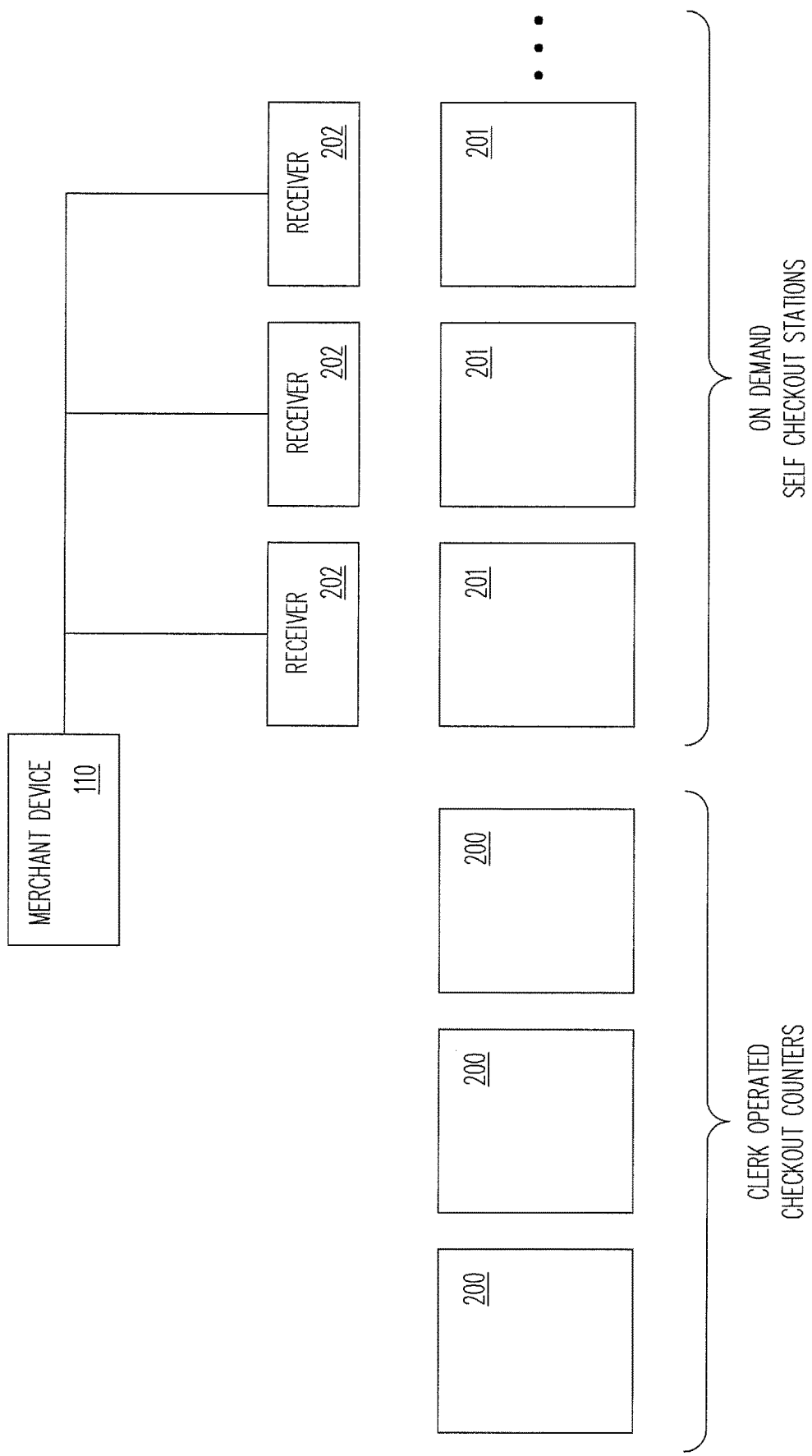
FIG. 2 is a block diagram showing further detail of the system for on demand self checkout, according to an embodiment.

FIG. 2 is a block diagram showing further detail of the system for on demand self checkout, according to an embodiment. One or more conventional clerk operated checkout counters 200 can be provided and used for checkout in the conventional manner. Alternatively, there can be no clerk operated checkout counters 200. There can be any number of clerk operated checkout counters 200.

There can be one or more on demand self checkout stations 201. There can be an indefinite number of on demand self checkout stations 201. There can be any number of on demand self checkout stations 201. The number of on demand self checkout stations 201 can depend upon the demand for the on demand self checkout stations 201. The maximum number of on demand self checkout stations 201 can depend upon the floor space available and/or the capacity of the merchant device 110 to communicate with user's mobile devices 120 during checkout. The maximum number of on demand self checkout stations 201 can be defined by the merchant and can be set, such as via a parameter stored by the merchant device 110.

According to an embodiment, the number of the on demand self checkout stations 201 can be determined by software and therefore is not necessarily substantially limited by hardware. That is, adding additional on demand self checkout stations 201 can typically be accomplished without adding substantial hardware, fixtures, or other items and can be accomplished simply by changing a software setting. According to an embodiment, adding additional on demand self checkout stations 201 can be accomplished without adding any additional hardware, fixtures, or other items Accordingly to an embodiment, the on demand self checkout stations 201 will generally be inactive. That is, at least some of the on demand self checkout stations 201 will be disabled and unused until needed. For example, a merchant can set up the on demand self checkout system such that the clerk operated checkout counters 200 are to be used first. Then, when additional checkout capacity is needed, one or more of the on demand self checkout stations 201 can be activated or enabled. By disabling some or all of the on demand self checkout stations 201, the users can be forced to use the clerk operated checkout counters 200 and/or any enabled on demand self checkout stations 201. In this manner, user checkout can be better monitored or supervised by store personnel.

Thus, the on demand self checkout stations 201 can be generally be kept in an inactivated or disabled state. Keeping the on demand self checkout stations 201 in an inactivated or disabled state can prevent the use thereof when the merchant would prefer that the on demand self checkout stations 201 not be used. For example, the merchant may prefer that the on demand self checkout stations 201 not be used when sufficient clerk operated checkout counters are available. The merchant may only want the on demand self checkout stations 201 to be used when the self checkout process can be at least somewhat monitored or supervised. Generally, one checkout clerk or the like can monitor a plurality of on demand self checkout stations 201.

According to an embodiment, the on demand self checkout stations 201 cannot be used until enabled. In this manner, the merchant can maintain better control of the checkout process and thereby better prevent undesirable loss of merchandise. Store personnel, e.g., checkout clerks, can determine which, if any, of the on demand self checkout stations 201 can be used. That is, the store personnel can determine which of the on demand self checkout stations 201 can be enabled and used by users to perform a self checkout.

The store personnel can determine an order in which the on demand self checkout stations 201 are to be enabled. Thus, the users can be required to use certain ones of the on demand self checkout stations 201 first, before using other ones of the on demand self checkout stations 201. For example, the store personnel can predetermine that the closest on demand self checkout station 201 to the clerk operated checkout counters 200 is to be enabled first, then the next closest on demand self checkout station 201 to the clerk operated checkout counters 200 is to be enable, and so on.

The number of on demand self checkout stations 201 and the order in which the on demand self checkout stations 201 are enabled can be either predetermined or determined during use thereof. For example, number of on demand self checkout stations 201 and the order in which the on demand self checkout stations 201 are enabled can be determined during a setup process for the on demand self checkout system. As a further example, the number of on demand self checkout stations 201 and the order in which the on demand self checkout stations 201 are enabled can be determined in real time, such as when users are checking out.

The number of the on demand self checkout stations 201 can be determined by the users. Additional on demand self checkout stations 201 can be enabled in response to user requests. The user requests can be made to store personnel, or to the on demand self checkout system. The user requests can be made to the on demand self checkout system via a local device (such as a button or other control located at one of the on demand self checkout stations 201), via a sensor (that senses the presence of the user at one of the on demand self checkout stations 201), via the user device (such as a user's mobile device 120), or any in other manner.

For example, sensors can sense the presence of one or more users in or near the on demand self checkout stations 201. The sensors can be infrared sensors, ultrasound sensors, cameras, motions sensors, weight sensors, or any other type of sensors suitable for sensing the presence of a person. The sensors can sense the presence of a shopping cart or shopping basket, such as by radio frequency identification (RFID) tags. The sensors can sense the presence of merchandise that is sold by the store, such as by radio frequency identification (RFID) tags.

In response to a request or to sensing a person, shopping cart, shopping basket, store merchandise, or the like, the on demand self checkout system can enable the on demand self checkout station 201 where the user or users are located. Approval of store personnel can be required for the on demand self checkout system to enable the on demand self checkout station 201. Thus, the on demand self checkout system can either enable on demand self checkout stations 201 autonomously or only with human approval, as determined by the merchant during a set up process.

The on demand self checkout stations 201 can be enabled in a logical order. For example, every other one of the on demand self checkout stations 201 can be enabled in order and then the remaining on demand self checkout stations 201 can be enabled in order. As a further example, every other third one of the on demand self checkout stations 201 can be enabled in order and then the remaining on demand self checkout stations 201 can be enabled in a similar fashion. The on demand self checkout stations 201 can be enabled in a logical, non-logical, random, or pseudo random order. The merchant can specify the specific order or a rule for defining an order for enabling the on demand self checkout stations 201.

According to an embodiment, any desired on demand self checkout stations 201 can be enabled and used for self checkout on an ad hoc basis. Thus, a user or store personnel can select any desired on demand self checkout stations 201 and enable the selected on demand self checkout stations 201 for self checkout. Different on demand self checkout stations 201 can be enabled to only accept specific types or categories of purchases. For example, on demand self checkout stations 201 located farther away from store personnel and/or closer to exits may be enabled to only accept transactions below a certain dollar amount and/or non-age based items, which would exclude alcohol, tobacco, and other items.

According to an embodiment, the on demand self checkout stations 201 can only be enabled and used for self checkout according to predetermined rules, e.g., in a predetermined order. In this instance, such ad hoc opening of the on demand self checkout stations 201 cannot be performed.

For example, the store personnel can predetermine an order that tends to minimize congestion proximate the on demand self checkout stations 201. The on demand self checkout stations 201 can be enabled in the predetermined order or in any other desired order.

The on demand self checkout stations 201 can be disabled in the same order in which the on demand self checkout stations 201 were enabled. The on demand self checkout stations 201 can be disabled in any of the orders discuss herein with respect to enabling the on demand self checkout stations 201. The on demand self checkout stations 201 can be disabled in any desired order. For example, the on demand self checkout stations 201 can be disabled in an order that tends to minimize congestion proximate the on demand self checkout stations 201.

On demand self checkout stations 201 can be created on an ad hoc basis at any desired permanent or temporary merchant location. For example, a portable on demand self checkout system can facilitate the creation of on demand self checkout stations 201 at a temporary location of a merchant, such as at a swap meet or trade show. The on demand self checkout system can facilitate the creation of on demand self checkout stations 201 at a location within the store that is not generally used for checkout, such as away from the clerk operated checkout counters 200. The on demand self checkout system can facilitate the creation of on demand self checkout stations 201 at a location outside of the store, such as in a parking lot of the store. For example, a mobile device similar to the user's mobile device 120 can be owned by the store or the merchant and can be used to set up an on demand self checkout station 201. A location system such as a GPS system of the mobile device 120 can be used, such as in cooperation with with the merchant device 110, to determine a location for the on demand checkout station 201. The merchant owned mobile device can communicate with the merchant device 110, the payment server 130, and the receivers 202, such as via Internet 140, a LAN, WIFI, a telecom network, or by any other means of communication to facilitate setting up of the on demand self checkout station 201.

The on demand self checkout system can comprise one or more wireless receivers 202 for facilitating communication with the user's mobile device 120 and/or the merchant device 110. The receivers 202 can be portable, fixed, or any combination thereof. The receivers 202 can communicate with the merchant device 110 via either a wired connection or a wireless connection.

Either the merchant device 110 or the receivers 202 can contain barcode decoders. The barcode decoders can be configured to only decode bar codes from enabled on demand self checkout stations 201. The merchant device 110 and/or the payment server 130 can be configured to only facilitate purchase transactions from clerk operated checkout counters 200 and enabled on demand self checkout stations 201.

A portable, wireless receiver 202 can communicate with the user's mobile device 120 and/or merchant device 110, for example, via a wireless method such as WiFi, WiMAX, Bluetooth, or near field communications (NFC). The portable, wireless receiver 202 can be battery operated. The portable, wireless receiver 202 can require no connections. Since the wireless receiver 202 can require no connections, the wireless receiver 202 can be used substantially anywhere to define an on demand self checkout station 201. The store personnel can simple move a portable, wireless receiver 202 to a location where an on demand self checkout station 201 is desired and can modify or re-configure the software, such as via a setup page, to facilitate use of the new on demand self checkout station 201.

The software can be configured to require no modification or re-configuration when a new on demand self checkout station 201 is added. That is, the software can be configured to accept the new on demand self checkout station 201 is without human intervention.

According to an embodiment, the store has one or more receivers 202 that cover substantially the entire store. In this instance, a new on demand self checkout station 201 can be placed anywhere within the store without requiring the addition of a receiver 202 or the moving of a receiver 202.

One or more of the receivers 202 can be used to receive communications from user's mobile devices 120. Thus, the receivers 202 can receive information regarding the checkout. For example, the receivers 202 can receive information regarding products purchased by the user, such as stock keeping unit (SKU) codes or other product identifications, product quantities, product weights (such as for produce or other products sold by the pound), bar codes, and the like. A scale can be provided at one or more of the on demand self checkout stations 201 or elsewhere to facilitate weighing of products such as produce.

According to an embodiment, the merchant device 110 can be configured to receive communications directly from user's mobile devices 120. Thus, the merchant device 110 can comprises a receiver or a transceiver for facilitating communication with the user's mobile device 120. In this instance no or fewer receivers 202 are required.

One receiver 202 can be provided for each of the on demand self checkout stations 201. Alternatively, each receiver 202 can accommodate more than one of the on demand self checkout stations 201. For example, each receiver 202 can accommodate two, three, four, five or more of the on demand self checkout stations 201. Generally, the use of fewer receivers 202 with more on demand self checkout stations 201 will require than each receiver be capable of accommodating more user's mobile devices 120.

As a further alternative, more than one receiver 202 can be provided for each on demand self checkout stations 201. For example, each on demand self checkout stations 201 can have two, three, four, five or more receivers 202. Any number of receivers 202 can be used with any number of on demand self checkout stations 201. Generally, the use of more receivers 202 with each on demand self checkout station 201 will provide more reliable reception of the user's mobile devices 120. The use of more receivers 202 can increase the potential size of the on demand self checkout stations 201 or the size of the potential locations of the on demand self checkout stations 201. That is, the on demand self checkout stations 201 can be larger and/or located at more different places.

The user's mobile devices 120 can communicate with the merchant device 110 via the receivers 202. The user's mobile devices 120 can communicate with the merchant device 110 via WiFi, WiMAX, Bluetooth, near field communications (NFC), the cellular network, the Internet, a local area network (LAN), a wide area network (WAN), or any combination thereof. The user's mobile devices 120 can communicate with the merchant device 110 via any desired method.

One or more receivers 202 can communicate with the merchant device 110. The number of receivers 202 can correspond to the number of on demand self checkout stations 201. For example, there can be one receiver 202 for each on demand self checkout stations 201, there can be one receiver for each two on demand self checkout stations 201, or there can be one receiver 202 for each three on demand self checkout stations 201. Generally the number of receivers 202 for each on demand self checkout stations 201 will depend upon the number of channels (e.g., separate mobile devices that the receiver can communicate with simultaneously), the range of the receivers 202, and the physical layout of the on demand self checkout stations 201. More distance and/or structures between the on demand self checkout stations 201 can necessitate the use of more receivers 202.

Figure 3:
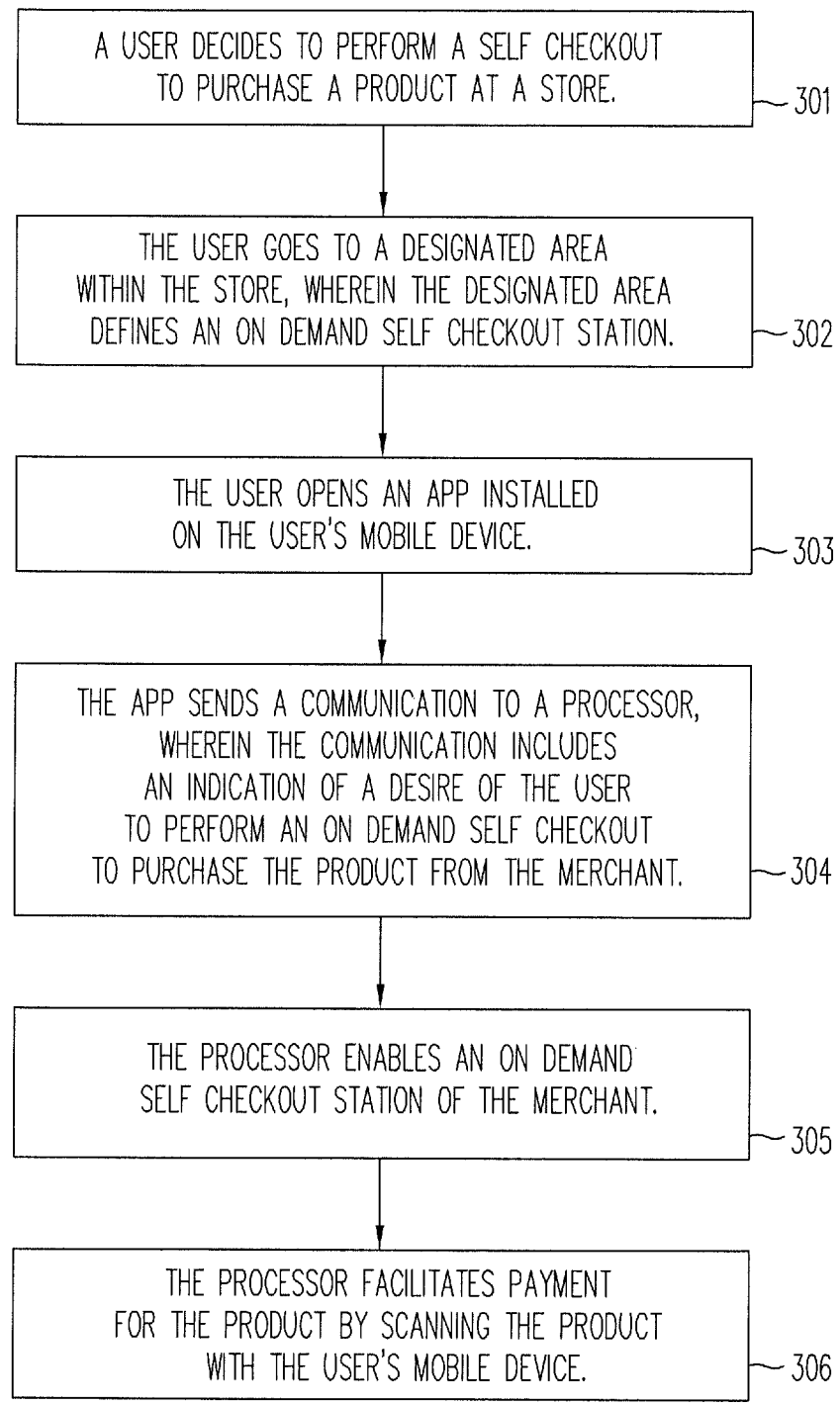
FIG. 3 is a flow chart showing operation of the system for on demand self checkout, according to an embodiment.

FIG. 3 is a flow chart showing operation of the method for on demand self checkout, according to an embodiment. Note that one or more of the steps described herein may be combined, omitted, or performed in a different order as desired or appropriate.

A user can decide to perform a self checkout to purchase a product at a store, as shown in step 301. The user can decide to perform the self checkout due to lines that are undesirably long at the clerk operated checkout counters 200. The user can decide to perform the self checkout simply because the user prefers self checkout. The user can decide to perform the self checkout for any reason or for no particular reason.

According to an embodiment, the user can go to a designated area within the store, wherein the designated area defines an on demand self checkout station 201, as shown in step 302. The area can be designated with a counter, a sign, walls, partitions, or any other structures. The area can be designated with paint, tape, or other markings on the floor, or any other indicia.

The area can be designated in any manner. The area can be undesignated and the user can be directed to the area by store personnel, for example.

According to an embodiment, the locations of the on demand self checkout stations 201 are not defined. The user can perform on demand self checkout anywhere within the store or within any defined area (such as a portion of the store, the parking lot, etc).

According to an embodiment, the on demand self checkout stations 201 can be defined by their locations within the store, e.g., by their coordinates. The GPS 123 of the user's mobile device 120 can be used to verify that the user is at the location of one of the on demand self checkout stations 201. Self checkout can be permitted only at the locations of the on demand self checkout stations 201.

According to an embodiment, the locations of the on demand self checkout stations 201 can be defined by the reception area of the receivers 202. Thus, if one of the receivers 202 can communicate with the user's mobile device 120, then the user can be determined to be at one of the on demand self checkout stations 201.

If no active or enabled on demand self checkout stations 201 are available, the user can request that another on demand self checkout station 201 be enabled for the user. For example, the user can make the request verbally to a store clerk or can make the request electronically via a device, such as a device at or near the on demand self checkout stations 201. The user can make the request electronically via the user's mobile device 120, such as via an app of the user's mobile device 120.

According to an embodiment, no particular areas of the store are designated for on demand self checkout. In this instance, the user can perform self checkout anywhere within the store. For example, the user can perform self checkout near the clerk operated checkout counters 200 within the store.

The user can open an app installed on the user's mobile device, as shown in step 303. The user can use the app to initiate the self checkout process, e.g., to request that an on demand self checkout station 201 be enabled. The user can use the app to scan the products being purchased and to make payment for the products being purchase.

The user's mobile device 120 can be used to scan the products being purchased. For example, the user's mobile device 120 can be configured to facilitate bar code reading, near field communications (NFC), radio frequency identification (RFID), and/or any other type of scanning or communications and the products can be tagged or otherwise compatible with such scanning.

According to an embodiment, a scanner provided by the merchant can be used to perform self checkout at the on demand self checkout stations 201. The store provided scanner can be fixed or anchored at the on demand self checkout stations 201. The store provided scanner can be a portable device that can be carried, such as by the user, to the on demand self checkout stations 201.

According to an embodiment, the on demand self checkout system will only accept checkout information, e.g., the results of product scanning such as bar codes, from user's mobile devices 120 that are located at the on demand self checkout station 201. Thus, users can be prevented from scanning products for self checkout at other locations (such as anywhere other than one of the on demand self checkout stations 201). In this manner, the self checkout process can be better monitored by store personnel.

Thus, the app can send a communication to a processor, such as the processor 112 of the merchant device 110 or the processors 131 of the payment server 130, wherein the communication includes an indication of a desire of the user to perform an on demand self checkout to purchase the product from the merchant, as shown in step 304. The processors 112, 131 can enable one of the on demand self checkout stations 201 of the merchant, as shown in step 305. The processors 112, 131 can facilitate payment for the product by scanning the product with the user's mobile device, as shown in step 306. Payment processing can be through known methods, such as transaction details being communicated to the payment provider through the app, the payment provider processing the details, which may include user account and identifier information and authentication, merchant info nation, and transaction details. The user account may be accessed to determine if any restrictions or limitations may prevent the transaction from being approved. If approved, the payment provider may send a notification to the merchant and/or the user.

Sensors and the processor 112 can be used to determine or predict when additional on demand self checkout stations 201 are to be opened. For example, sensors at the clerk operated checkout counters 200, at the on demand self checkout stations 201, and/or located elsewhere in the store can cooperated with the processor 112 to determine that sufficient users are at the clerk operated checkout counters 200 or are moving toward the clerk operated checkout counters 200 to justify opening another clerk on demand self checkout stations 201.

A light, bell, horn, or other indicator or annunciator can inform store personnel that one of the on demand self checkout stations 201 is enabled. The light, bell, horn, or other indicator or annunciator can inform store personnel that the on demand self checkout stations 201 is being used for self checkout.

The number, size, shape and location of the on demand self checkout stations 201 can be readily changed. According to an embodiment, only a software change is necessary to change the number or size of one or more of the on demand self checkout stations 201. For example, an area of the store may suddenly have opened up so that the on demand self checkout station within that area can be expanded, such as software increasing or expanding coordinates of the on demand self checkout area. Changing the size and shape of the on demand self checkout stations 201 can be as simple as moving a sign that designates the on demand self checkout stations 201. Changing the location of the on demand self checkout stations 201 can require moving the receivers 202. However, one or more receivers 202 can be placed in the store such that all desired or possible locations for the on demand self checkout stations 201 are covered thereby, thus eliminating the need to move the receivers 202 when a later move of the on demand self checkout stations 201 is desired.

According to an embodiment, one or more users can use the same on demand self checkout station 201 at the same time. Such plural users can use the same on demand self checkout station 201 to check out the products that they have each selected for purchase. Each on demand self checkout station 201 is identified or associated with an area or space of the store. One or more users can be present in the same area, e.g., the same on demand self checkout station 201, and the users can perform self checkout generally simultaneously. The number of users that can perform self checkout simultaneously using a single on demand self checkout station 201 will typically be limited by the area, e.g., floor space, of the on demand self checkout station 201.

In implementation of the various embodiments, embodiments of the invention may comprise a personal computing device, such as a personal computer, laptop, PDA, cellular phone or other personal computing or communication devices. The payment provider system may comprise a network computing device, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as a processing component (e.g., processor, microcontroller, digital signal processor (DSP), etc.), a system memory component (e.g., RAM), a static storage component (e.g., ROM), a disk drive component (e.g., magnetic or optical), a network interface component (e.g., modem or Ethernet card), a display component (e.g., CRT or LCD), an input component (e.g., keyboard or keypad), and/or cursor control component (e.g., mouse or trackball). In one embodiment, a disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Enabling the on demand checkout stations 201 can be allowing the on demand checkout stations 201 to be used by the user. For example, enabling the on demand checkout stations 201 can be facilitating or permitting communications between the receivers 202 and the user mobile devices 120 that are being used for on demand checkout.

Figure 4:
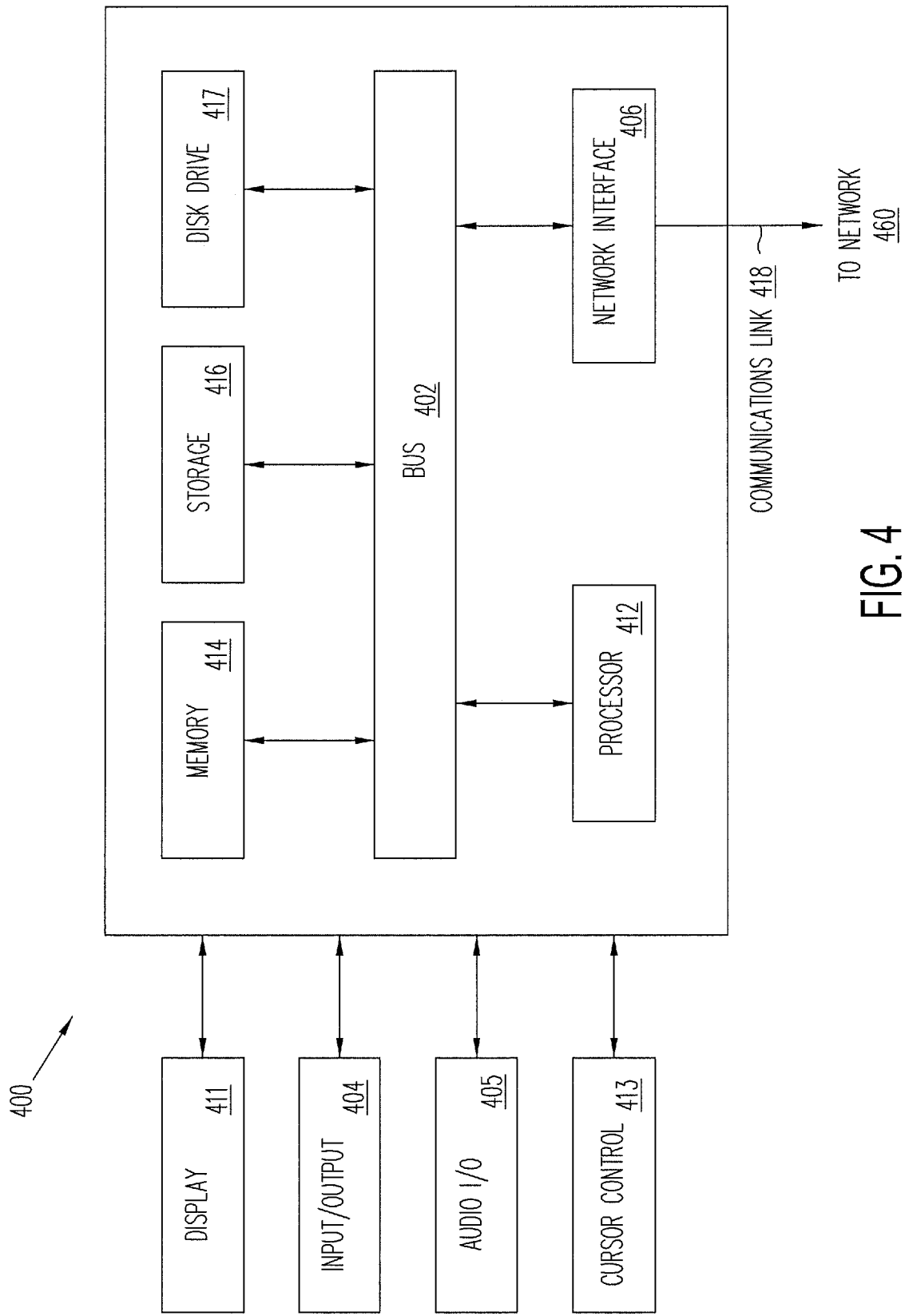
FIG. 4 is a block diagram of an example of a computer that is suitable for use in the system for on demand self checkout according to an embodiment.

FIG. 4 is a block diagram of a computer system 400 suitable for implementing one or more embodiments of the present disclosure. In various implementations, the PIN pad and/or merchant terminal may comprise a computing device (e.g., a personal computer, laptop, smart phone, tablet, PDA, Bluetooth device, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as a user device, a merchant server, or a payment provider server via network 460. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable and executable media include, for example, floppy disk, flexible disk, hard disk, magnetic tape, any other magnetic medium, CD-ROM, any other optical medium, punch cards, paper tape, any other physical medium with patterns of holes, RAM, ROM, E2PROM, FLASH-EPROM, any other memory chip or cartridge, carrier wave, or any other medium from which a computer is adapted to read.

In various embodiments, execution of instruction sequences for practicing the invention may be performed by a computer system. In various other embodiments, a plurality of computer systems coupled by a communication link (e.g., LAN, WLAN, PTSN, or various other wired or wireless networks) may perform instruction sequences to practice the invention in coordination with one another.

Modules described herein can be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa—for example, a virtual Secure Element (vSE) implementation or a logical hardware implementation.

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

As used herein, the term "store" can include any business or place of business. The store can be a brick and mortar store or an online store. The store can be any person or entity that sells a product.

As used herein, the term "product" can include any item or service. Thus, the term "product" can refer to physical products, digital goods, services, or anything for which a user can make a payment, including charitable donations. A product can be anything that can be sold.

As used herein, the term "merchant" can include any seller of products. The term merchant can include a store. The products can be sold from a store or in any other manner.

As used herein, the term "mobile device" can include any portable electronic device that can facilitate data communications, such as via a cellular network and/or the Internet. Examples of mobile devices include cellular telephones, smart phones, tablet computers, and laptop computers.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A system for providing on-demand checkout stations at a store, comprising:
   a non-transitory memory; and
   one or more hardware processors coupled to the non-transitory memory and configured to read instructions from the non-transitory memory to cause the system to perform operations comprising:
      determining, based on a plurality of sensors associated with the store of a merchant, locations of a plurality of user devices of users within the store;
      selecting, from a plurality of checkout stations at the store, a subset of checkout stations based on the locations of the plurality of user devices and a predetermined order for activating checkout stations of the plurality of checkout stations, wherein each of the plurality of checkout stations comprises a wireless receiver operable to communicate with any one of the plurality of user devices within a service boundary based on an operation range of the corresponding wireless receiver;
      activating the subset of checkout stations;
      receiving, by a payment processing server from a first user device of the plurality of user devices, a request for performing an on-demand self-checkout in association with a purchase at the store, wherein the request comprises user credentials associated with a payment account associated with the first user device;
      determining, using at least one of the plurality of sensors, a first location of the first user device inside the store;
      determining whether the first location of the first user device is within a service boundary associated with any one of the subset of checkout stations within the store;
      in response to determining that the first location of the first user device is not within the service boundary associated with any one of the subset of checkout stations, activating a first checkout station of the plurality of checkout stations that is not part of the subset of checkout stations to facilitate the on-demand self-checkout based on the first location of the first user device and the predetermined order, wherein the activating comprises causing the first checkout station to switch from operating in an inactive state to operating in an active state for communicating with the first user device;

receiving, by the payment processing server, transaction information related to the purchase from the first user device via the first checkout station;

in response to receiving the transaction information related to the purchase, processing, by the payment processing server, a payment in association with the purchase using the payment account associated with the first user device based on the credentials received directly from the first user device; and causing the first checkout station to switch from operating in the active state to operating in the inactive state after the payment is processed.

2. The system of claim 1, wherein the store of the merchant includes fixed checkout counters and the plurality of checkout stations.

3. The system of claim 1, wherein the operations further comprise:

in response to determining that the first location of the first user device is outside a first service boundary of the first checkout station, providing instructions to the first user device to move toward an area associated with the first service boundary.

4. The system of claim 1, wherein the operations further comprise determining specific restrictions associated with the first checkout station, wherein the first checkout station is activated to facilitate the on-demand self-checkout for the purchase based on determining that the purchase satisfies the specific restrictions.

5. The system of claim 1, wherein the store is at a temporary location of the merchant.

6. A method comprising:

determining, based on a plurality of sensors associated with a store of a merchant, locations of a plurality of user devices of users within the store;

selecting, from a plurality of checkout stations at the store, a subset of checkout stations based on the locations of the plurality of user devices and a predetermined order for activating checkout stations of the plurality of checkout stations, wherein each of the plurality of checkout stations comprises a wireless receiver operable to communicate with any one of the plurality of user devices within a service boundary based on an operation range of the corresponding wireless receiver;

activating the subset of checkout stations;

receiving, by one or more hardware processors associated with a payment provider server from a first user device of the plurality of user devices, a request for performing an on-demand self-checkout in association with a purchase from the store, wherein the request comprises credentials associated with a payment account;

determining, using at least one of the plurality of sensors, a first location of the first user device inside the store;

determining whether the first location of the first user device is within a service boundary associated with any one of the subset of checkout stations within the store;

in response to determining that the first location of the first user device is not within the service boundary associated with any one of the subset of checkout stations, activating a first checkout station of the plurality of checkout stations that is not part of the subset of checkout stations to facilitate the on-demand self-checkout based on the first location of the first user device and the predetermined order, wherein the activating comprises causing the first checkout station to switch from operating in an inactive state to operating in an active state for communicating with the first user device;

receiving, by the one or more hardware processors, transaction information related to the purchase from the first user device via the first checkout station;

in response to receiving the transaction information related to the purchase, processing, by the one or more hardware processors, a payment in association with the purchase using the payment account based on the credentials received directly from the first user device; and causing the first checkout station to switch from operating in the active state to operating in the inactive state after the payment is processed.

7. The method of claim 6, wherein the store of the merchant includes fixed checkout counters and the plurality of checkout stations.

8. The method of claim 6, further comprising:

in response to determining that the first location of the first user device is outside a first service boundary associated with the first checkout station, providing instructions to the first user device to move toward an area within the first service boundary.

9. The method of claim 6, further comprising:

determining a price restriction associated with the first checkout station; and determining that an amount associated with the purchase satisfies the price restriction before activating the first checkout station to facilitate the on-demand self-checkout.

10. The method of claim 6, wherein the store is at a temporary location of the merchant.

11. A non-transitory machine-readable medium having stored thereon machine-readable instructions executable to cause a machine associated with a payment processing server to perform operations comprising:

determining, based on a plurality of sensors associated with a store of a merchant, locations of a plurality of user devices of users within the store;

selecting, from a plurality of checkout stations at the store, a subset of checkout stations based on the locations of the plurality of user devices and a predetermined order for activating checkout stations of the plurality of checkout stations, wherein each of the plurality of checkout stations comprises a wireless receiver operable to communicate with any one of the plurality of user devices within a service boundary based on an operation range of the corresponding wireless receiver;

activating the subset of checkout stations;

receiving, from a first user device of the plurality of user devices, a request for performing an on-demand self-checkout in association with a purchase from the store, wherein the request comprises user credentials associated with a payment account;

determining, using at least one of the plurality of sensors, a first location of the first user device inside the store;

determining whether the first location of the first user device is within a service boundary associated with any one of the subset of checkout stations within the store;

in response to determining that the first location of the first user device is outside the service boundaries associated with the subset of checkout stations, activating a first checkout station of the plurality of checkout stations that is not part of the subset of checkout stations to facilitate the on-demand self-checkout based on the first location of the first user device and the predetermined order, wherein the activating comprises causing the first checkout station to switch from operating in an inactive state to operating in an active state for communicating with the first user device;

receiving transaction information related to the purchase from the first user device via the first checkout station;

in response to receiving the transaction information related to the purchase, processing a payment in association with the purchase using the payment account based on the credentials received from the first user device; and causing the first checkout station to switch from operating in the active state to operating in the inactive state after the payment request is processed.

12. The non-transitory machine-readable medium of claim 11, wherein the store includes fixed checkout counters and the plurality of checkout stations.

13. The non-transitory machine-readable medium of claim 11, wherein the operations further comprise determining specific restrictions associated with the first checkout station.

14. The non-transitory machine-readable medium of claim 11, wherein the store is at a temporary location of the merchant.

15. The system of claim 1, wherein a weight of an item being purchased by the user is communicated to the system by the first checkout station.

16. The method of claim 6, wherein each of the plurality of checkout stations further comprises an annunciator, wherein the method further comprises activating the annunciator of the first checkout station to inform store personnel that the first checkout station is in use when the first checkout station is operating in the active state.

17. The non-transitory machine-readable medium of claim 11, wherein each of the plurality of checkout stations further comprises an annunciator, wherein the operations further comprise activating the annunciator of the first checkout station to inform store personnel that the first checkout station is in use when the first checkout station is operating in the active state.

18. The system of claim 1, wherein the operations further comprise:
   transmitting, to the first user device, instructions for capturing product information related to the purchase; and
   causing the first user device to transmit the captured product information related to the purchase to the wireless receiver of the first checkout station.

19. The method of claim 6, further comprising:
   transmitting, to the first user device, instructions for capturing product information related to the purchase; and
   causing the first user device to transmit the captured product information related to the purchase to the wireless receiver of the first checkout station.

20. The non-transitory machine-readable medium of claim 11, wherein the operations further comprise:
   transmitting, to the first user device, instructions for capturing product information related to the purchase; and
   causing the first user device to transmit the captured product information related to the purchase to the wireless receiver of the first checkout station.

21. The non-transitory machine-readable medium of claim 13, wherein the specific restrictions comprise a price restriction, wherein the operations further comprise determining that an amount associated with the purchase satisfies the price restriction before activating the first checkout station to facilitate the on-demand self-checkout.

* * * * *

UNITED STATES PATENT AND TRADEMARK OFFICE
CERTIFICATE OF CORRECTION

PATENT NO.         : 10,755,535 B2                                Page 1 of 1
APPLICATION NO.    : 13/591763
DATED              : August 25, 2020
INVENTOR(S)        : Jagadish Bhalchandra Paranjape It is certified that error appears in the above-identified patent and that said Letters Patent is hereby corrected as shown below:

In the Specification

Column 11, Line 1, please correct as follows:
merchant information, and transaction details. The user Signed and Sealed this
Seventeenth Day of November, 2020

Andrei Iancu
*Director of the United States Patent and Trademark Office*